United States Patent [19]
Burant et al.

[11] 4,072,801
[45] Feb. 7, 1978

[54] DEFERRED ACTION BATTERY HAVING IMPROVED BOTTOM PORT COVER

[75] Inventors: Leonard Joseph Burant, Milwaukee; James Thomas Daley, Grafton, both of Wis.

[73] Assignee: Globe-Union Inc., Milwaukee, Wis.

[21] Appl. No.: 784,254

[22] Filed: Apr. 4, 1977

[51] Int. Cl.² ............................................. H01M 6/34
[52] U.S. Cl. .................................... 429/110; 429/119
[58] Field of Search .................. 429/119, 118, 110, 72

[56] References Cited
U.S. PATENT DOCUMENTS

| | | | |
|---|---|---|---|
| 3,255,048 | 6/1966 | Comanor et al. | 429/119 |
| 3,427,201 | 2/1969 | Burant et al. | 429/119 |
| 3,472,699 | 10/1969 | Jackley et al. | 429/119 X |

*Primary Examiner*—Anthony Skapars
*Attorney, Agent, or Firm*—David B. Smith; John Phillip Ryan

[57] ABSTRACT

A deferred action battery including a plurality of stacked electrode plates functional to produce an electrical potential when immersed in seawater, the battery having a bottom port cover including an opening for admitting seawater into the battery and a cavity in communication with the opening and intended to facilitate migration of precipitate waste material from the battery during its operation.

8 Claims, 7 Drawing Figures

DEFERRED ACTION BATTERY HAVING IMPROVED BOTTOM PORT COVER

BACKGROUND OF THE INVENTION

1. Field of the Invention

The present invention relates to deferred action batteries or seawater batteries of the type wherein the battery is immersed in seawater so that seawater filling the battery functions as the electrolyte.

2. The Description of the Prior Art

Deferred action batteries of the type using seawater as the electrolyte are commonly constructed using a plurality of spaced apart parallel silver chloride battery plates and magnesium battery plates arranged in alternately stacked relationship. Batteries of this type are described, for example, in U.S. Pat. No. 3,630,782; issued Dec. 28, 1971 to Butler, U.S. Pat. No. 3,306,775; issued Feb. 28, 1967 to Burant et al., U.S. Pat. No. 3,431,148; issued Mar. 4, 1969 to Jones, and U.S. Pat. No. 3,451,855; issued June 24, 1969 to Jones et al. Batteries of the type shown in these patents have been found to be useful in a number of applications, but due to the use of silver in their construction they tend to be expensive.

The cost of such batteries can be substantially reduced by substituting lead chloride plates for the silver chloride plates therein, thereby eliminating the material cost of the silver. Seawater batteries having such lead chloride plates are referred to, for example, in U.S. Pat. No. 3,468,710; issued Sept. 23, 1969 to Kransnow et al., in U.S. Pat. No. 3,943,004 issued to Honer et al. Mar. 9, 1976, and in U.S. Pat. Application Ser. No. 653,270; filed Jan. 28, 1976, and assigned to an assignee in common with that of the present invention.

Use of lead chloride plates as the cathode electrode in seawater batteries has, however, presented some drawbacks because the chemical reaction occuring in the battery produces quantities of solid waste precipitate which tends to clog up the battery and thereby reduce its effective life. In a lead chloride magnesium type battery, when seawater flows into the battery, an electrical potential is produced as a result of the electrochemical reactions at the electrodes.

At the cathode

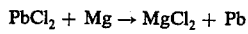

$$PbCl_2 + Mg \rightarrow MgCl_2 + Pb$$

At the anode

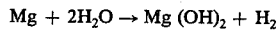

$$Mg + 2H_2O \rightarrow Mg(OH)_2 + H_2$$

The magnesium hydroxide $Mg(OH)_2$ produced by the latter reaction forms a precipitate which accumulates in the battery. Unless this precipitate material is permitted to migrate out of the battery through the seawater inlet openings, it results in the clogging of the battery and premature termination of its useful life. However, the useful life of the battery would be similarly shortened if larger ports were provided to permit escape of the precipitate from the battery. Such ports would of necessity result in increased flow of seawater into the battery and consequent communication of seawater electrolyte between the cells of the battery thereby causing unnecessary ion transfer between cells and premature failure of the battery. The accumulation of magnesium hydroxide precipitate is also encountered in silver chloride-magnesium seawater batteries commonly used, but in the lead chloride batteries the problems inherent in the accumulation of precipitate are substantially increased. Compared to a silver chloride battery, a lead chloride battery employs a greater number of stacked cells to produce the same voltage since each of the stacked cells of a lead chloride battery produce about 1 volt whereas similar cells of a silver chloride battery produce approximately 1½ volts. Therefore, if compared to a silver chloride battery, a lead chloride battery requires a greater number of cells stacked together, the battery is thicker, and consequently the precipitate must migrate greater distances if it is to be emitted from the water inlet opening. On the other hand, it is not efficient to indiscriminately increase the size or number of the water inlet openings to permit emission of the precipitate magnesium hydroxide since it is necessary to control the amount of water admitted into the battery and the intercell flow of water. Therefore, in order to maximize the efficiency and the useful life of a lead chloride seawater battery it is necessary to restrict the size of the water inlet opening yet provide means to facilitate emission of precipitate solid materials from the battery through the seawater inlet opening.

SUMMARY OF THE INVENTION

The present invention provides an improved seawater battery having lead chloride plates and improved means facilitating removal of the precipitate formed in the battery yet maintaining the water inlet port at a minimum size thereby preventing undue leakage currents between the cells of the battery. As a result, a seawater battery can be produced which will have a sufficiently long life yet will not have the substantial material cost of silver chloride batteries.

The lead chloride battery is provided with an improved bottom port cover providing a water inlet opening and having a cavity or chamber therein in communication with the water inlet opening and functional to receive $Mg(OH)_2$ precipitate formed in the cells. The floor of the cavity slopes downwardly and forwardly from the rear portion of the battery toward the water inlet opening thereby providing a slide to facilitate discharge of the precipitate through the water inlet opening. The cavity for receiving the precipitate $Mg(OH)_2$ provides a receptacle for the precipitate to collect in whereby the precipitate does not restrict the efficient operation of the battery, and the slope of the floor leading to the opening in the battery wall facilitates migration of sufficient quantities of the magnesium hydroxide precipitate to prevent the collection of precipitate in the battery and resultant clogging.

The particular construction of the bottom cover has the effect of maximizing the efficiency of the battery since it prevents plugging or clogging of the spaces between the battery plates and facilitates the use of a relatively small water inlet port so that the flow of water within the battery between the battery cells can be held to a minimum thereby reducing leakage currents and preventing an unnecessarily rapid deterioration of the battery plates. The bottom cover thus facilitates the construction of a lead chloride seawater battery which will generate a required amount of current for a requisite period of time and which can comprise a sufficiently compact and reasonably light weight unit.

The drawings and the following description refer to a preferred embodiment of the invention. The invention further includes other possible embodiments not inconsistent with the claims.

DESCRIPTION OF A PREFERRED EMBODIMENT

Figure 1:
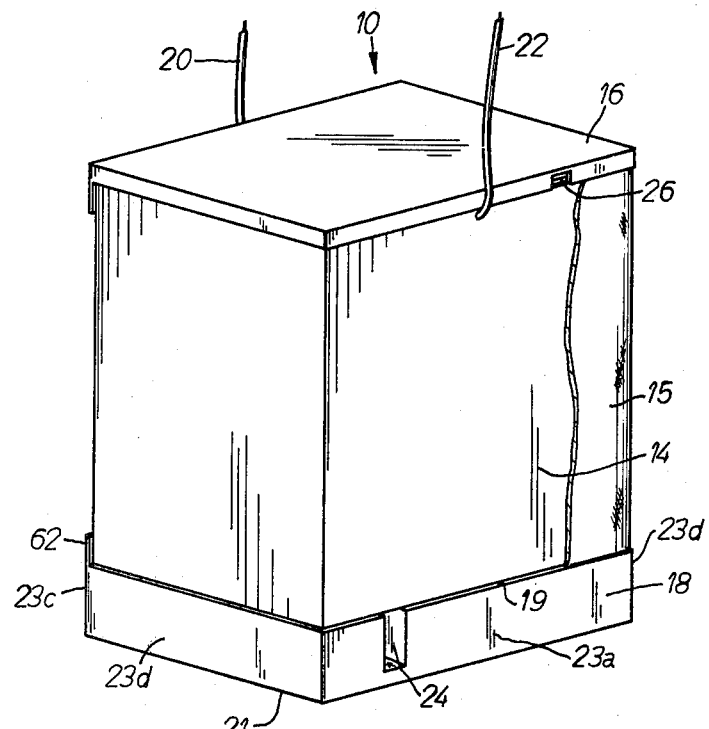
FIG. 1 is a perspective view of the preferred embodiment of the lead chloride seawater battery of the invention.
Figure 2:
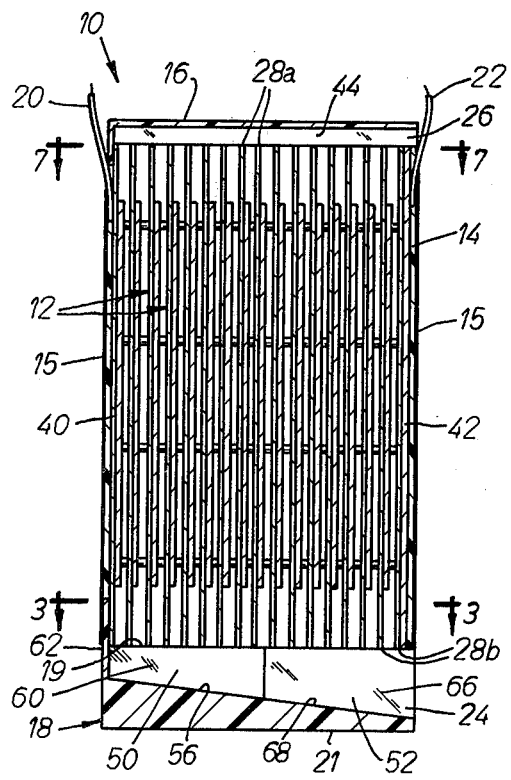
FIG. 2 is a cross-sectional elevation view of the seawater battery shown in FIG. 1.
Figure 3:
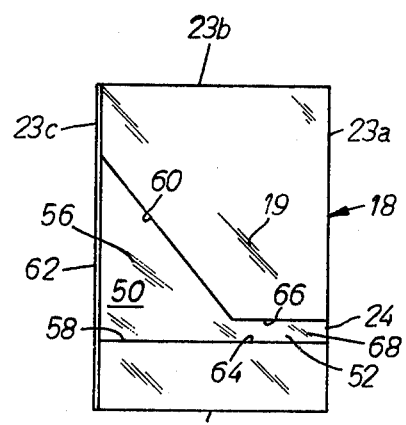
FIG. 3 is a cross-sectional plan view of the bottom port cover of the seawater battery taken generally along line 3—3 in FIG. 2.
Figure 4:
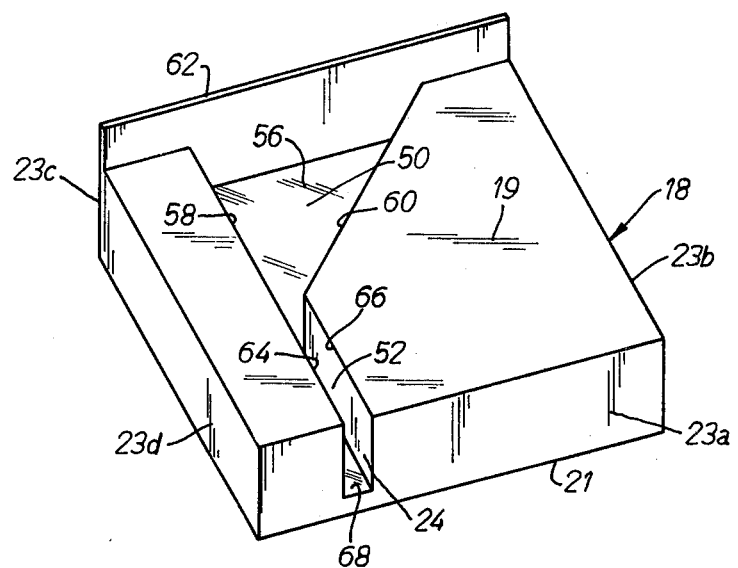
FIG. 4 is a perspective view of the bottom port cover shown in FIG. 3.

A lead chloride seawater battery 10 is shown in FIGS. 1 and 2 as comprising a generally rectangular structure including a plurality of parallel stacked electrode assemblies 12 held in generally vertical relationship, a case comprised of a layer of epoxy material 14 encased by a layer of fabric tape 15 and defining a chamber for receiving a stack of electrode assemblies 12, a top cover 16 sealing the upper end of the stack of electrode assemblies, a bottom cover 18 sealing the lower end of the stack of electrode assemblies, and positive and negative terminal wires 20 and 22, respectively, electrically connected to the stack of electrode assemblies. In operation, when the battery 10 is dropped into seawater, water flows into the battery through a water inlet port 24 in the bottom cover 18 and functions as an electrolyte therein. The presence of the electrolyte within the electrode assemblies 12 causes an electrochemical reaction well known to those skilled in the art and a potential is generated between the positive and negative terminal wires 20 and 22. During the operation of the cell, hydrogen gas is generated by the electrochemical reaction occuring in the battery and it is emitted through the outlet 26 in the top cover 16.

Figure 5:
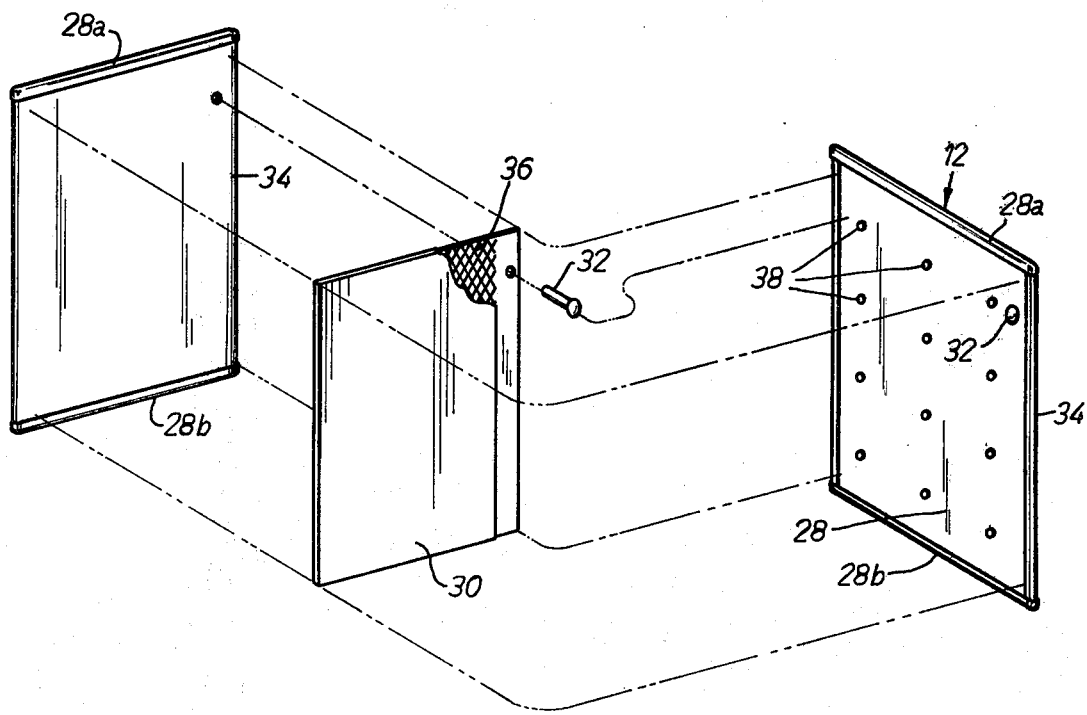
FIG. 5 is an exploded perspective view of the battery plates shown in FIG. 2.
Figure 6:
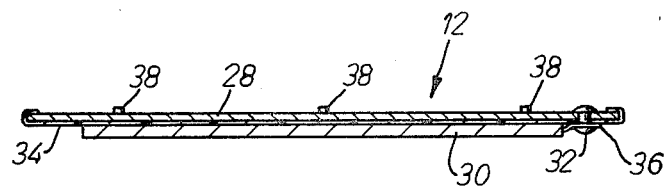
FIG. 6 is a cross-sectional plan view of one of the electrode assemblies shown in FIG. 2 and FIG. 7.

The electrode assemblies 12 are best illustrated in FIGS. 5 and 6 wherein a magnesium plate anode 28 and a lead chloride plate cathode 30 are shown connected by a rivet 32. A sheet of insulating material 34 comprised of, for example, polyethylene terephythalate resin (Mylar), is disposed between the magnesium plate 28 and lead chloride plate 30 to provide electrical insulation between the plates. The lead chloride plate is constructed in a manner described in U.S. Patent Application Ser. No. 653,270 filed Jan. 28, 1976 by Burant et al. and assigned to an assignee in common with that of the present invention. The lead chloride plate 30 includes a central generally planar nickel screen 36 which is coated with a thickness of lead chloride, and the nickel screen 36 projects from one edge of the lead chloride coating whereby electrical connection between the magnesium plate 28 and the lead chloride plate 30 is provided by the rivet 32.

Figure 7:
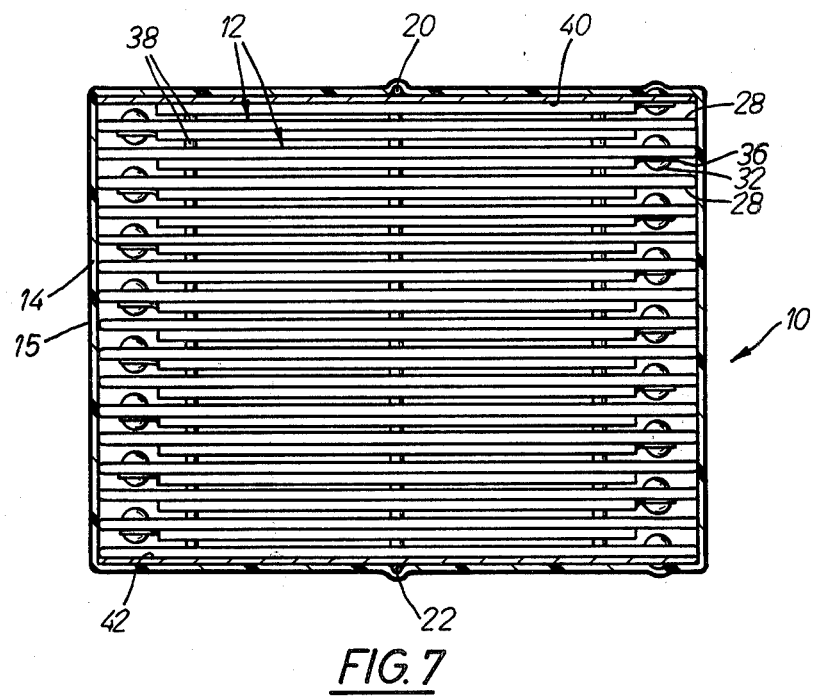
FIG. 7 is a cross-sectional plan view of the seawater battery taken generally along line 7—7 in FIG. 2.

As shown in FIGS. 2 and 7 the electrode assemblies 12 are stacked together in parallel spaced apart, generally vertical orientation such that the lead chloride cathodes 30 face, and are spaced apart from, an opposed magnesium anode 28 of an adjacent electrode assembly 12 to thereby form a cell, the cathodes 30 and anodes 28 defining a space therebetween for receiving seawater electrolyte. The cathodes 30 and anodes 28 are supported in spaced apart relation by thin vinyl separator dots 38. Each of the electro-chemical cells thus formed by the stacked electrode assemblies 12 generate an electrical potential in a manner well known to one skilled in the art. It will be noted that the electrode assemblies 12 are stacked alternately to accomodate the rivets 32. At the end of the stack of assemblies adjacent terminal wire 20, the end lead chloride electrode 30 is joined by a rivet 32 to an electrically conductive metal plate 40 and at the opposite end of the stack of electrode assemblies adjacent terminal wire 22, the magnesium plate 28 is joined by a rivet 32 to a conductive metal plate 42 and the positive terminal wire 20 is soldered to the conductive metal plate 40 and the negative terminal wire 22 is soldered to the metal plate 42.

The top cover 16 is received against the upper edges of the magnesium plates 28 to prevent flow of electrolyte around the upper edges 28a of the magnesium plates 28 and between the cells defined by the electrode assemblies 12. In order to facilitate emission of gas from each of these cells, the top cover 16 includes a central narrow channel 44 in its lower surface (FIG. 2) in communication with each of the spaces between the electrode plates and extending perpendicular to the electrode plates, and the channel 44 is open at the gas outlet 26, and closed at its end opposite the gas outlet 26. The channel 44 is thus in communication with each of the cells of the battery to permit the emission of hydrogen gas from the battery.

The bottom port cover 18 is received in fluid tight relationship against the lower edges 28b of the magnesium plates 28 (FIG. 2) and is maintained in sealed relationship against the electrode assemblies, the epoxy layer 14 surrounding the stacked electrode plates, forming a seal with the periphery of the upper surface of the bottom port cover. The bottom port cover 18 is generally comprised of a rectangular body having a generally planar upper surface 19 and a planar parallel bottom surface 21 and a plurality of planar side walls 23a, 23b, 23c and 23d. The front side wall 23a, which is parallel to the planes defined by the electrode plates 28 and 30, includes a rectangular opening therein such that when the bottom port cover is received against the stacked electrode plates, it defines the water inlet port or opening 24. The bottom port cover 18 also includes a chamber or cavity 50 in its upper surface 19 in fluid communication with the inlet port 24 and functional to facilitate water flow into the battery and migration of waste from the battery. When the bottom port cover 18 is sealed against the bottom of the stack of electrode assemblies as shown in FIG. 2, the cavity 50 is positioned below those stacked electrode plates furthest from the water inlet opening 24 and is in fluid communication with the spaces between these electrode plates so that it functions to provide a container for receiving precipitate generated by the battery cells and particularly those cells positioned away from the water inlet port 24 so that that precipitate material will not accumulate therein and deter the function of those cells. Communication between the cavity 50 and the water inlet port 24 is provided by a channel 52 extending therebetween. The cavity 50 is defined by a floor 56, a pair of vertical side walls 58 and 60 extending between the floor 56 and the lower edges 28b of the plates 28, and a vertical rear wall 62 comprising a central portion of the rear wall 23c and being generally coplanar with conductive plate 40.

The floor 56 is generally planar and slopes downwardly from the rear wall 62 toward the water inlet opening 24. In the preferred embodiment of the invention, the floor slopes downwardly at an angle of between 4° and 8° with respect to a plane parallel to the planar upper surface 19 to the bottom port cover. As an alternative, the slope can be between 2° and 20°. The vertical side wall 58 is shown as being generally perpendicular to the rear wall 62 and the electrode assemblies 12 while the vertical side wall 60 diverges with respect to the side wall 58 such that the side wall 60 defines an acute angle with respect to both the rear wall 62 and the opposed side wall 58 and such that the chamber 50 can be seen to define a truncated triangle when viewed in plan.

The channel 52 extending between the cavity 50 and water inlet port 24 is defined by a pair of vertical parallel side walls 64 and 66, which extend perpendicular to the electrode assemblies, and which are spaced apart by a distance substantially equal to the width of the water inlet port 24. The floor 68 of the channel 52 slopes downwardly and forwardly toward the water inlet port and is substantially coplanar with the floor 56 of cavity 50 (FIG. 2).

The drawings and the above description of the bottom port cover describe only a preferred embodiment and other configurations of the cavity 50 and channel 52 are similarly workable. For example, both of the vertical side walls 58 and 60 could diverge outwardly away from each other. Furthermore, the configuration of the cavity 50 could be modified such that it communicates directly with the water inlet port 24, thereby eliminating the channel 52. Additionally, though the cavity 50 is shown as having a width, adjacent the rear wall 62, of approximately one-half the overall width of the bottom port cover 18, this proportionate dimension could be varied. Similarly, the slope of the floor 56 of the cavity 50 and of the channel could be varied.

During the operation of the battery 10 when it has been immersed in seawater and $Mg(OH)_2$ precipitate forms and settles into the cavity 50, the flow of gaseous hydrogen through the outlet results in continued flow of some amounts of water into the battery through the inlet port 24. This flow of water through channel 52 and cavity 50 and the resultant turbulence created, in combination with the shape of cavity 50, channel 52 and the slope of the floors 56 and 68 facilitates the continuous migration of the precipitate toward the water inlet port 24. Sufficient quantities of the precipitate $Mg(OH)_2$ are emitted from the battery that it does not become clogged. On the other hand the configuration of the chamber 50 and channel 52 sufficiently restrict the flow of water from one cell to another to prevent the electrode assemblies from being prematurely consumed.

We claim:

1. A deferred action battery comprising: a casing having a chamber; an electrode assembly disposed within said chamber and including a plurality of stacked parallel electrode plates and spacing means disposed intermediate said electrode plates for maintaining predetermined electrolyte receiving spacings between said electrode plates, and said electrode assembly having opposite ends; and a bottom port cover positioned adjacent one of said opposite ends, said bottom port cover comprising a body having a plurality of sides and an upper surface positioned adjacent said one of said opposite ends, a water inlet opening in one of said sides, and a precipitate receiving cavity in said upper surface and in communication with at least one of said electrolyte receiving spaces for receiving precipitate from said one of said electrolyte receiving spaces, and a channel between said opening and said precipitate receiving cavity, said channel being transverse to said parallel electrode plates, and whereby upon immersion of said batteries in electrolyte, electrolyte may flow through said water inlet opening and said channel into said precipitate receiving cavity and into said spaces and precipitate can be emitted from said battery through said cavity and said water inlet opening.

2. The deferred action battery set forth in claim 1 wherein said cavity is defined by a plurality of walls and a floor, said walls including a rear wall, a second wall intersecting said rear wall and extending toward said opening, and a third wall defining an acute angle with respect to said rear wall and said second wall.

3. The deferred action battery set forth in claim 2 wherein said channel includes planar opposed spaced apart side walls, one of said side walls being generally coplanar with said second wall and the other of said walls intersecting said third wall.

4. The deferred action battery set forth in claim 2 wherein said floor slopes downwardly from said rear wall toward said water inlet opening.

5. The deferred action battery set forth in claim 1 wherein said cavity includes a generally planar floor, and said floor slopes downwardly from said cavity toward said water inlet opening.

6. A deferred action battery comprising: an electrode assembly including a plurality of stacked parallel electrode plates and spacing means disposed intermediate said pair of electrode plates for maintaining a predetermined electrolyte receiving spacing between said electrode plates, said electrode assembly including a plurality of generally planar sides and opposite ends; and a bottom port cover positioned adjacent one of said opposite ends, said bottom port cover comprising a body having a plurality of sides and an upper surface positioned adjacent said one of said opposite ends, a water inlet opening in one of said sides, and a precipitate receiving cavity in said upper surface and in communication with said water inlet opening and said electrolyte receiving spacings, said precipitate receiving cavity including a floor sloping downwardly from a side of said port cover opposite said water inlet opening toward said water inlet opening and in a direction transverse to the planes defined by said electrode plates.

7. The seawater battery set forth in claim 6 further including a channel between said cavity and said water inlet opening, said channel providing fluid communication between said opening and said cavity.

8. The deferred action battery set forth in claim 6 wherein said floor slopes downwardly at an angle which is between 1° and 10°.

* * * * *